(12) United States Patent
Natarajan et al.

(10) Patent No.: US 9,223,388 B2
(45) Date of Patent: Dec. 29, 2015

(54) POWER STATE TRANSITION SAVING SESSION INFORMATION

(71) Applicant: HEWLETT-PACKARD DEVELOPMENT COMPANY, L.P., Houston, TX (US)

(72) Inventors: Ajitkumar A. Natarajan, Campbell, CA (US); William Sumner, Plano, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 306 days.

(21) Appl. No.: 13/753,238

(22) Filed: Jan. 29, 2013

(65) Prior Publication Data

US 2014/0215237 A1 Jul. 31, 2014

(51) Int. Cl.
*G06F 1/32* (2006.01)
(52) U.S. Cl.
CPC ............ *G06F 1/3278* (2013.01); *G06F 1/3221* (2013.01); *G06F 1/3268* (2013.01); *G06F 1/32* (2013.01)
(58) Field of Classification Search
CPC ............................. G06F 15/16; G06F 1/3278
USPC ......................................................... 713/320
See application file for complete search history.

(56) References Cited

U.S. PATENT DOCUMENTS

| 7,856,526 | B2 | 12/2010 | Shibayama et al. |
| 8,086,881 | B2 | 12/2011 | Maruyama et al. |
| 8,132,033 | B2 | 3/2012 | Innan et al. |
| 8,149,747 | B2 * | 4/2012 | Sood et al. ................. 370/311 |
| 8,161,304 | B2 | 4/2012 | Hamilton |
| 8,185,765 | B2 | 5/2012 | Tsukada et al. |
| 2002/0016904 | A1 * | 2/2002 | Chrysanthakopoulos ...... 712/24 |
| 2005/0086397 | A1 * | 4/2005 | Huffman et al. ................ 710/15 |
| 2009/0132838 | A1 * | 5/2009 | Cherian et al. ................ 713/320 |
| 2009/0319611 | A1 * | 12/2009 | Turakhia ....................... 709/204 |
| 2009/0319811 | A1 * | 12/2009 | Kawakami .................... 713/320 |
| 2010/0115312 | A1 * | 5/2010 | Conrad et al. ................ 713/320 |
| 2010/0223418 | A1 * | 9/2010 | Kumasawa et al. .......... 710/316 |
| 2011/0063094 | A1 * | 3/2011 | Meiertoberens et al. .... 340/12.5 |
| 2012/0019306 | A1 * | 1/2012 | Turner et al. ................. 327/385 |
| 2012/0294192 | A1 * | 11/2012 | Masood et al. ............... 370/255 |
| 2013/0262898 | A1 * | 10/2013 | Preston et al. ................ 713/323 |
| 2014/0269471 | A1 * | 9/2014 | Wagh et al. ................... 370/311 |

OTHER PUBLICATIONS

Fusion-IO; Taming the Power Hungry Data Center; http://www.dell.com/downloads/global/products/pedge/en/Data_Center_Power_Savings_Whitepaper-en.pdf>; 2007.

\* cited by examiner

*Primary Examiner* — Thomas Lee
*Assistant Examiner* — Volvick Derose
(74) *Attorney, Agent, or Firm* — Hewlett Packard Enterprise Patent Department (57) ABSTRACT

Techniques for saving session information when transitioning a port to a low power state are provided. An indication of an intent to transition a port to a low power state is provided. Session information related to the port is saved. The port is transitioned to the low power state.

18 Claims, 7 Drawing Sheets

POWER STATE TRANSITION SAVING SESSION INFORMATION

BACKGROUND

Computing systems have many components that require power to operate. For example, processors, memory, storage devices, storage interconnect, Input/Output ports, network ports, and almost all other components of a computing system utilize power for operation. Large data centers may contain thousands of components, all of which require power. The cost of electricity to supply the power is an ongoing expense, which may eventually exceed the cost of the equipment itself.

Furthermore, a computing system's use of power generates heat. Excessive heat may cause components of the computing system to degrade, which may eventually require component replacement. In order to address the heat issue, cooling systems may be used to dissipate the generated heat. The cooling systems themselves are another component of the datacenter that use electricity, thus increasing the costs of operating the datacenter.

BRIEF DESCRIPTION OF THE DRAWINGS

FIGS. 6(A,B) is an example of a high level flow diagram for transitioning a target port to a low power state and returning to a normal power state.

DETAILED DESCRIPTION

A significant ongoing cost in the operation of a datacenter is the cost of electricity used to power the various computers, storage devices, switches, routers, enclosures, and other components within the datacenter. In addition to the direct cost of electricity, all of these components generate heat which can result in premature failure of the components, adding cost for component replacement. In order to address the heat issue, cooling systems, such as air conditioners may be utilized. However, the cooling systems themselves use large amounts of electricity, further adding to the cost of operating the datacenter. It would be desirable to reduce the amount of power consumed by the datacenter in order to reduce the costs associated with providing and utilizing the power.

One area of power use in a datacenter is in the storage subsystem. The storage subsystem typically includes host bus adaptors associated with the computers in the datacenter. These host bus adaptors may provide ports for communicating with a storage area network. It is through these ports, which may be referred to as initiator ports, that the computers access the persistent storage provided by the storage subsystem. The storage subsystem may also include a storage network or fabric. The storage network may include switches containing ports. These ports may be connected such that communications from the initiator ports may be routed to target ports.

Target ports allow for target devices to communicate with the initiator ports. For example, a target device may be a disk drive enclosure that houses a plurality of disk drives. The disk drives may be the storage devices that physically store data. The target device may include target ports that connect to the storage network to allow communications from the network to reach the storage devices.

One technique that has been used to reduce the amount of power consumed within a datacenter is to transition ports and storage devices from a normal power state to a low power state when those devices are not in use. For purposes of this description, a normal power state is a state wherein the full functionality of a component is available. For example, in the case of an initiator port, the normal power state may be a state wherein the initiator port may be fully utilized for communication with the storage network. Likewise, for a disk drive, the normal power state may be a state where the disk drive is spinning and the read write heads are fully available to read data from and/or write data to the disks.

A low power state may be a state in which less power is consumed than in the normal power state, albeit providing a lesser degree of functionality. For example, in the case of a target port, a low power state may be a state in which the port is only able to respond to a limited set of commands, such as a wake up command. In the case of a disk drive, a low power state may be a state where the disks are no longer spinning. In either case, in order to utilize the device, the device must transition back to a normal power state prior to the utilization. It should be understood that there may be various levels of low power states. For example, in massive array of idle disk (MAID) systems, multiple MAID levels are specified, with different degrees of power saving at each level. MAID level 0 is the normal power mode, and the full capabilities of the disk are available. MAID level 1 parks the read/write heads, thus reducing the power consumed. MAID level 2 slows down the rate at which the disks spin, further reducing the power consumed. MAID level 3 stops the disks completely. For purposes of this description, MAID level 0 may be considered as operating at normal power, while the remaining MAID levels may be considered as operating at low power.

When a host computer determines that there is no data to be read from and/or written to a storage device, the host computer may transition the initiator port to a low power state in order to conserve power. Likewise, when a storage device, such as a disk drive, has not been utilized for a period of time, the target may determine that it can transition the storage device to a low power state, e.g., stop the disks from spinning.

The technique described above introduces several problems. First, there is no coordination between the various components across the entire storage subsystem. For example, a host may determine that it would be beneficial to transition the initiator port to a low power state. However, the target port and disks associated with the target port are not aware of this transition and continue to operate in the normal power state, even though there is no possibility of receiving a read/write request from the initiator. Thus, the opportunity for additional power savings by transitioning the target ports and/or storage devices to a low power state is lost.

A second problem that arises from this lack of coordination is the performance impact on the storage system when components individually determine if they will transition to a low power state. For example, a disk drive may not have had any read/write requests for a period of time and has determined that it should transition to a low power state by stopping the rotation of the disks. However, as soon as the disks are stopped, a read/write request may be received from the host. Thus, the rotation of the disks must be restarted. This not only causes unnecessary wear on the disks themselves, but also creates latency problems while the disks are spun back up and returned to the normal power state.

Finally, a performance problem related to latency is introduced. When a component is transitioned to a low power state, session information is lost. For example, in the case of a Fibre channel storage network, if an initiator port is transitioned to a low power state, all session information related to the port is lost. When the port is transitioned back to the normal power state, the session must be recreated by going through a discovery process to determine what target ports and storage devices are available to the initiator port. Until the discovery process is complete, no data may be read/written, thus introducing latency which negatively impacts performance. It should be noted that although the description presented herein is in terms of a Fibre channel storage network, the techniques described are applicable to any other type of storage network. For example, Fibre Channel over Ethernet (FCoE), Serial Attached Small Computer Systems Interface (SAS), or any other storage network utilizing initiator ports, target ports, and a storage fabric could also benefit from the techniques described herein.

Techniques provided herein overcome at least the problems described above. Transitions to low power state are coordinated between the components of the storage network, such that individual components do not transition to a low power state independently and without awareness of the state of the overall storage network. An initiator port that intends to transition to a low power state may notify downstream components of this intent. For purposes of this description, an initiator port may be considered the start of the communications flow. Communications sent from the initiator port may be considered downstream communications. Communications sent from other components to the initiator port may be considered upstream communications. The downstream components may determine if a transition to a low power state is appropriate and supported, and if so, transition to a low power state. The return to a normal power state is similarly coordinated.

When transitioning to a low power state, session information for the connection may be retained. When the time arrives for the component to return to the normal power state, the session information may be restored. Retaining session information may allow for reduced latency in returning to the normal power state. The delay introduced in reestablishing the session and rediscovery may be avoided. A more detailed description of these techniques is provided below in conjunction with the attached figures.

Figure 1:
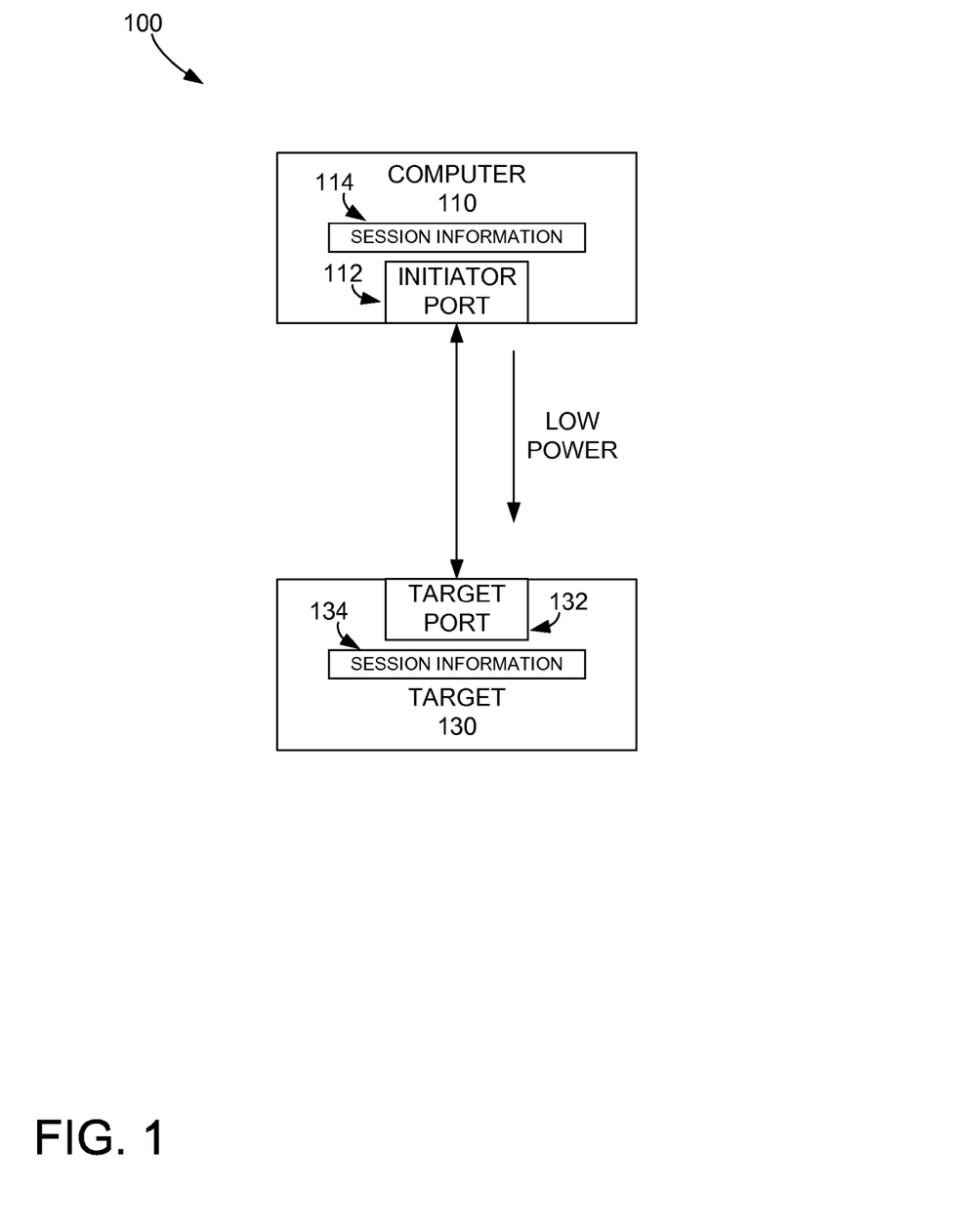
FIG. 1 is a high level example of a system utilizing techniques described herein.

FIG. 1 is a high level example of a system utilizing techniques described herein. The system shown in FIG. 1 includes a small subset of components in a typical datacenter in order to more clearly describe the techniques presented herein. It should be understood that this simplified depiction is for purposes of ease of description and not by way of limitation. System 100 may include a computer 110 and a target 130. The computer may include an initiator port 112. The initiator port may be included on a host bus adaptor and may be utilized by the computer in order to communicate with the target.

System 100 may also include a target 130. The target may include a target port 132. The target port may allow communication between the initiator port 112 and the target 130. Typically, the target may be part of the storage system and may include storage devices (not shown). When the system is initialized, the initiator port, under the control of the computer 110 may go through a discovery process. This process allows the initiator port to determine to which target ports it may communicate with. This in turn may determine to which storage resources (not shown), which are presented to the initiator ports as logical units, communications are possible. The initiator port may then establish communications sessions with the identified target ports. The session information 114 may be stored on the computer. Likewise, when the session is established, the target port may also maintain session information 134 related to the initiator port. In this simplified description, only a single session between one initiator port and one target port is shown. A more detailed system is described with respect to FIG. 2.

In operation, the computer 110 may determine that the initiator port 112 may not be needed for a period of time. For example, the initiator port may be used to conduct computer backups, which may only be performed during a backup window that is in the middle of the night. As such, it would be expected that the initiator port would not be used outside of the backup window. As another example, the computer may be running a workload that does not require storage system access for a period of time. During the period of time that the initiator port is not expected to be used, the initiator port may be transitioned to a low power state to conserve power.

Once the computer has determined that the initiator port is to be transitioned to a low power state, the initiator port may send an indication of the intent to transition to a low power state to the target port. The target port may receive this indication and determine that it should also transition to a low power state. Prior to transitioning to a low power state, the target port may save the session information 134 of the session that was established with the initiator port. The target port may then send a response acknowledging the transition to the low power state to the initiator port. In some cases, the target port may also include in the response an amount of time needed to transition back to the normal power state. The target port may then transition to the low power state. In the low power state, the target port may only be able to respond to a subset of commands. For example, the target port may only be able to respond to a "wake up" command, but is otherwise dormant, and consuming a reduced amount of power.

Upon receipt of the acknowledgement from the target port, the initiator port may also save its session information 114. The initiator port may then transition to a low power state. At some point, the computer may determine that access to the storage system is needed and that the initiator port should be transitioned back to the normal power state. The computer may then transition the initiator port back to the normal power state. As part of this process, the session information that was previously stored may be restored, thus obviating the need to go through a discovery process.

The initiator port may then send an indication to the target port indicating that the target port should transition back to a normal power state. Upon receipt of this "wake up" indication, the target port may return to a normal power state. The target port may restore the previously saved session information 134, obviating the need to go through a discovery process again. In some implementations, the computer may make use of the information related to time to return to normal power provided in the response. For example, the computer may be able to determine, in advance, that access to the storage system may be needed. For example, a workload may be starting that will likely access the storage subsystem. The computer may then start the process of returning the initiator and target ports to the normal power state prior to the actual access of the storage subsystem by the workload. If the process is started at a time slightly before the amount of time needed by the target port to transition to the normal power state, the target port may already be in the normal power state when the storage system access request from the workload is received, thus preventing any delay in the workload's execution.

In some cases, it is possible that the target port may not understand the command indicating the intent of the initiator port to transition to a low power state. For example, the vendor of the target including the target port may have chosen not to implement the described functionality. In such cases, the target port may simply ignore the indication of the intent to transition to a low power state. As such, the initiator port would not receive an acknowledgement from the target port. In such cases, the session information would not be saved. When the initiator port is transitioned back to a normal power state, the discovery process described above is repeated. Although latency is introduced, this still allows for backwards compatibility for devices that have not implemented the techniques described herein.

Figure 2:
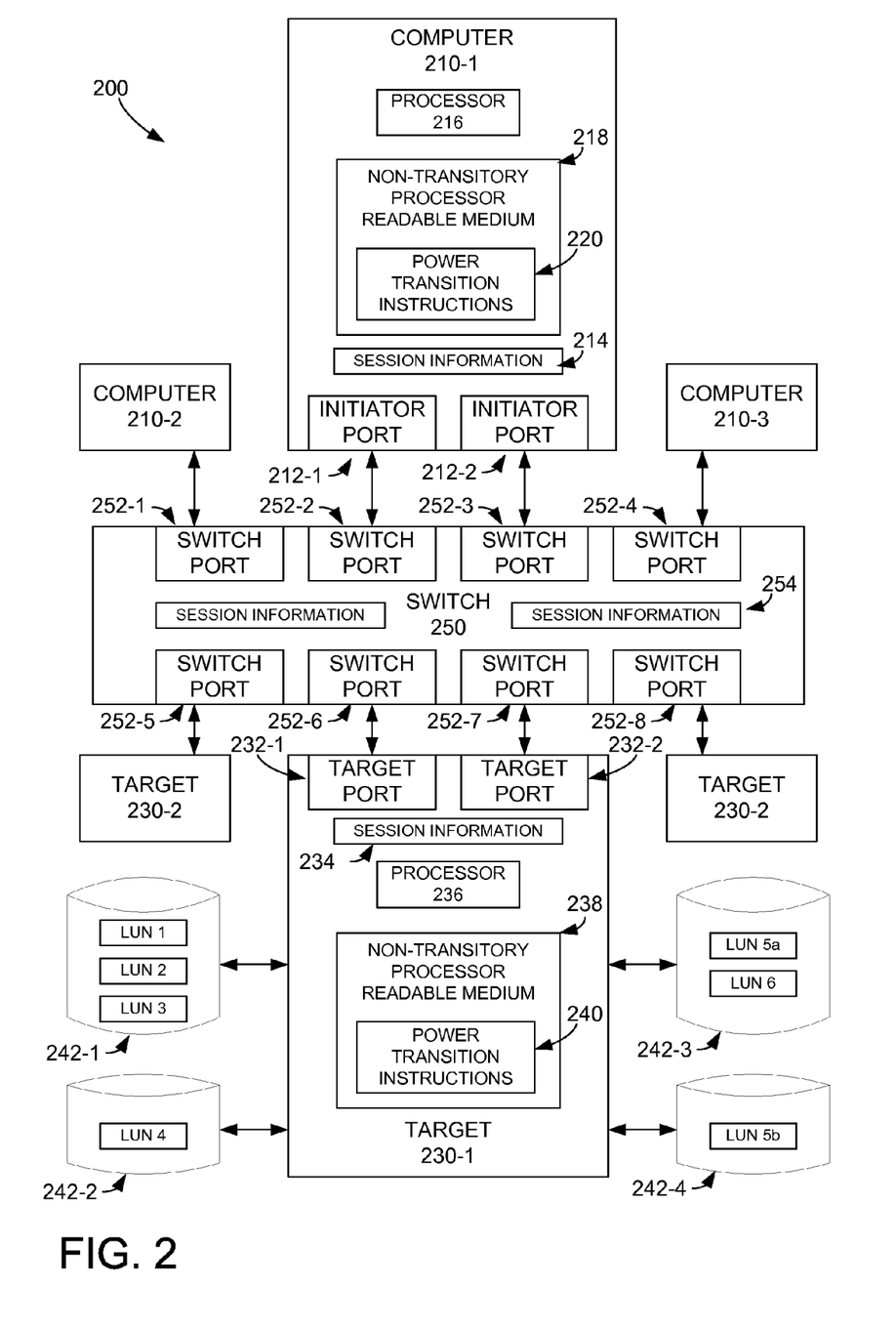
FIG. 2 is another high level example of a system utilizing techniques provided herein.

FIG. 2 is another high level example of a system utilizing techniques provided herein. System 200 is a more detailed example of a system that may utilize the techniques described herein. System 200 may include a plurality of computers 210-(1-3). Although only 3 computers are shown, this is for purposes of ease of description. Any number of computers is possible. System 200 also includes targets 230-(1-3). Although only a single target is shown in detail, each target may have a similar structure, although not necessarily identical. Connecting the computers and the targets may be a switch 250. Although only a single switch is shown, any number of switches is possible. Furthermore, although connection from the computers to the targets is shown through a single switch, it should be understood that there may be any number of switches in the path between the computer and the targets.

Computers 210-(1-3) may also be referred to as hosts. The hosts may be the same type of computer or may be different types. In general, each of the hosts will have a structure similar to that depicted with respect to computer 210-1, although the hosts need not be identical. For example, each host may have a different number of initiator ports. Computer 210-1 may include a processor 216. Coupled to the processor may be a non-transitory processor readable medium 218. The non-transitory processor readable medium may contain thereon a set of power transition instructions 220. The processor may read and execute the power transition instructions from the non-transitory processor readable medium to provide the functionality described herein.

Computer 210-1 may also include initiator ports 212-1,2. As described above, the computer may communicate with the storage system through the initiator ports. Although two ports are shown, there may be more ports or fewer ports. The computer may use the ports to communicate with storage devices on storage targets. For each communications link, the computer may store session information 214. It should be understood that although depicted as a single block, session information may be stored individually for each path from an initiator port to a target port. Thus, a single initiator port may have multiple sessions operating concurrently to different target ports.

System 200 may also include a target device 230-1. For example, the target device, also referred to as a target, may be a disk drive enclosure that houses a plurality of storage devices 242-(1-4). For example, storage devices 242(1-4) may be disk drives. However, the techniques described herein are applicable to any type of storage device, including tape drives and solid state drives, for example. Target device 230-1 may include a processor 236. Coupled to the processor may be a non-transitory processor readable medium 238. The non-transitory processor readable medium may contain thereon a set of power transition instructions 240. The processor may read and execute the power transition instructions from the non-transitory processor readable medium to provide the functionality described herein.

The target 230-1 may also include target ports 232-1,2. As described above, the target may communicate with the computers through the target ports. Although two ports are shown, there may be more ports or fewer ports. The target may use the ports to communicate with switches, which in turn are connected to initiator ports. For each <initiator port, target port> tuple, the target may store session information 234. It should be understood that although depicted as a single block, session information may be stored individually for each <initiator port, target port> tuple. Thus, a single target port may have multiple sessions operating concurrently to different initiator ports.

Coupled to the target 230-1 may be a plurality of storage devices 242-(1-4). For example, storage devices may be disk drives, flash drives, solid state drives, or any other type of persistent storage medium. The storage devices may be abstracted to form logical units each having a logical unit number (LUN), which from the perspective of the initiators appear to be single units of storage which can be read from or written to. For example, storage device 242-1 includes LUNs 1, 2, and 3. Each of these logical units may be presented to appear to an initiator as an independent device, despite the fact that they all reside on a single physical device. In some cases, there may be a one to one relationship between a logical unit and a physical storage device. For example, LUN 4 may reside on storage device 242-2. In other cases, a logical unit may be spread across multiple storage devices. For example, LUN 5-(a,b) may be split across storage devices 242-3 and 242-4. Although LUN 5 appears to an initiator as a single unit of storage, it is actually dependent on the operation of two storage devices.

System 200 may also include a switch 250. Although only a single switch is shown, it should be understood that there may be any number of switches. Furthermore, although connections are shown as passing from the computers through the switch to the target, there may actually be any number of switches disposed between the computers and the targets. Switch 250 may contain a plurality of switch ports 252-(1-8). Initiator ports and target ports may connect to the switch ports. The switch may route traffic entering on one port to a different port.

The switch may also maintain session information 254 for each connection between an initiator port and a target port. In other words, the switch may maintain session information for the session between the initiator port and the switch port, the session between the switch port and the target port, and information regarding the interconnection of the switch ports to each other. For example, a communications path may be established from initiator port 212-1, through switch port 252-2, to switch port 252-6, ending on target port 232-1. There may be session information stored for the link between the initiator port 212-1 and switch port 252-2. There may also be session information stored for the link between switch port 252-6 and target port 232-1. Finally, there may be information regarding the internal switch interconnection of switch ports 252-2 and 252-6 stored. There may be a second communications path from initiator port 212-2, through switch port 252-3, to switch port 252-6, ending on target port 232-1. This communications path will have its own session information, despite the fact that both communications paths terminate on target port 232-1. In general, it should be understood that session information describes a specific path from the initiator ports, through any intermediate switch ports, to a target port.

In operation, a computer may determine that an initiator port may be transitioned to a low power state. As explained above, this may be due to a number of factors, such as the port not being needed outside of a backup window or a workload that does not need access to the storage systems at this time. Regardless of the reason, the computer may determine that an initiator port may be transitioned to a low power state. The computer, through the initiator port, may inform the target port of the intention to transition to a low power state.

Upon receipt of the indication at the target port, the target device may determine which logical units are accessible to the initiator port through the target port that received the indication. All such determined logical units may be marked as being unavailable to the initiator port through that target port. The target port may respond to the initiator port, optionally including the amount of time needed to return to normal power state. In some implementations, the response is not sent until after it is determined if any storage devices will be transitioned to the low power state, as will be described below. The target device may then determine if all initiator ports that can access a given logical unit are in or will soon transition into the low power state. If so, the entire logical unit may be marked as unavailable to all initiators, and the logical unit as a whole may be marked as being in a low power state. It should be noted that marking a logical unit as being in a low power state does not necessarily allow for a storage device containing the logical unit to be transitioned to a low power state. If the logical unit is transitioned to the low power state, the target may determine if every logical unit that has content on a given storage device is also marked as being in a low power state. If so, the storage device itself may be transitioned to a low power state. For example, in the case of a disk drive, the disk may be spun down.

An example may be helpful in understanding the transition of a storage device to a low power state. For this example, assume LUNs 1, 3, 4, and 5 are associated with initiator port 212-1, which is about to transition to low power state. Assume LUNs 2 and 6 are associated with a different initiator port that is not transitioning to low power state. LUNs 1, 3, 4, and 5 may be marked as being in a low power state with respect to initiator port 212-1 and target port 232-1. With respect to storage device 242-1, LUN 2 is still associated with a normal power initiator port. As such, storage device 242-1 may not be transitioned to a low power state, as it needs to remain accessible for access to LUN 2. Storage device 242-2 is only associated with LUN 4. As such, all initiators associated with LUNs that utilize storage device 242-2 are or will be in the low power state. Thus, the entire storage device may be transitioned to a low power state. With respect to storage devices 242-3, because LUN 5 is associated with a low power initiator, the logical unit may be marked as being unavailable to initiator 212-1. However, because LUN 6 is still associated with an initiator that is in the normal power state, storage device 242-3 cannot be transitioned to the low power state. Storage device 243-4 is only associated with LUN 5. All initiators associated with LUN 5 are in a low power state and no other LUNs accessible from other initiators are on storage device 242-4. As such, storage device 242-4 may be transitioned to the low power state.

If all initiator ports that access a given target port are in or transitioning to low power state, the target device may transition the target port itself to a low power state. For example, if target port 232-1 is only accessed by initiator port 212-1, then target port 232-1 may be transitioned to the low power state. However if a target port is also accessed by at least one initiator port that is not transitioning to a low power state, then the target port may not transition to a low power state.

If it is determined that the target port 232-1 may transition to a low power state, the target port may send an indication of the intent to switch to a low power state to the switch. The target port may then save session information related to all initiator ports that communicate with the target port. The target port may then transition to a low power state.

Upon receipt of the indication that a target port is transitioning to a low power state, the switch may also store session information related to the target port. The switch may then transition the port 252-6 connected to the target port to a low power state. Likewise, the switch may transition the port 252-2 connected to initiator port 212-1 into a low power state after saving session information after the initiator port communicates its intent to the switch to transition to low power state. In general, a port may be switched to low power state if all other ports connected to it are also in or are transitioning to low power state.

Upon receiving the response message from the target port, the initiator port 212-1 may then save session information and transition to the low power state. At this point, all possible ports and storage devices that may be transitioned to a low power state without impacting other ports have been transitioned to the low power state. This is achieved in a manner that is coordinated across the entire storage system.

At some point, it may be determined that an initiator port that is in the low power state should be transitioned to the normal power state. For example, the backup window may have arrived or a workload running on the computer may need access to the storage system. In cases where the time to return to normal power is provided in the response from the target port, the following process may be started at least that amount of time prior to accessing the storage system, thus ensuring all components have been returned to normal power prior to access of the storage system. However, even if the time to return to normal power is not provided, the sequence for returning to normal power is the same, but is just delayed until an actual access to the storage system is received.

In transitioning back to normal power, the steps may essentially be reversed. The initiator port may first transition back to normal power. The initiator port may then restore the previously saved session information. The initiator port may then send an indication of the return to normal power state to the switch. The switch may then restore the session with the initiator port using the previously stored session information.

The initiator port may then inform the target port to restore the session. If the target port had transitioned to low power state, the target port transitions back to normal power state and restores the session using the previously stored session information. The target port then informs the switch of the return to normal power state. The switch may restore the session using the previously stored session information.

The target port may then mark all logical units accessible to the initiator port through that target port as being in the normal power state. In cases where the storage device(s) on which the logical units reside were transitioned to the low power state, those devices themselves are then returned to the normal power state. In the case of a disk drive, this may involve spinning the disk back up to operating speed or providing power to a solid state drive. The target port may then respond to the initiator port that the transition to normal power has completed. Thus, the system is returned to a normal power mode in a manner that is coordinated across the entire storage system. Although the previous description restores the session between the target port and the switch prior to restoring the logical units, it should be understood that this is only an example implementation. In other example implementations, the order may be reversed.

As mentioned previously, it is possible that one or more of the components described above may not have implemented the techniques described herein. In such cases, the system may revert to a backwards compatibility mode. For example, if a target port has not implemented the techniques described herein, it will not be able to properly respond to the indication of the intent of the initiator port to transition into a low power state. In such cases, the initiator port may receive an error response or no response at all. In such cases, the initiator port is made aware that the target port does not understand the coordinated transition to the low power state. As such, the initiator port may skip attempts at coordinating the transition with the target port. However, if the switch does understand the coordinated transition, the techniques can still be applied between the switch and the initiator port. The session between the initiator port and the switch may be saved and the respective ports transitioned to low power, even though the target port may not be transitioned to low power. When the time to transition back to a normal power state arrives, components that were able to understand the transition to a low power state are transitioned to the normal power state using saved session information, while those that were not able to understand are rediscovered using the discovery process. Likewise, if a component is removed or replaced by a different component while the coordinated low-power state was in effect, the stored session information may no longer be valid. Again, the normal discovery process may be used to discover the moved or replaced components.

Figure 3:
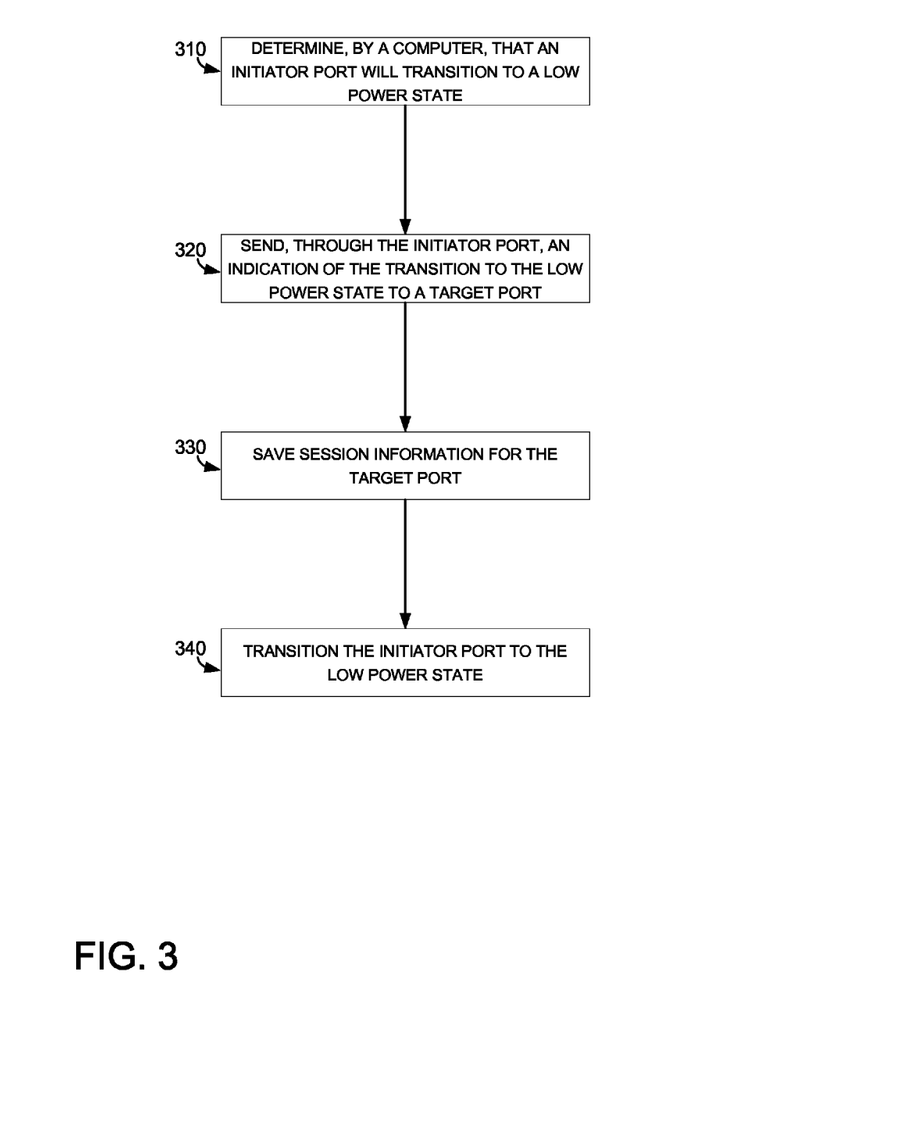
FIG. 3 is an example of a high level flow diagram for transitioning an initiator port to a low power state.

FIG. 3 is an example of a high level flow diagram for transitioning an initiator port to a low power state. In block 310 a computer may determine that an initiator port will transition to a low power state. As explained above, this may be due to being outside a backup window, a workload not requiring access to the storage system, or any other reason. In block 320, an indication of the transition to the low power state may be sent, through the initiator port, to a target port.

In block 330, session information for the target port may be saved. This information may be used when the time arrives to transition the initiator port back to the normal power state. In block 340, the initiator port may be transitioned to the low power state.

Figure 4:
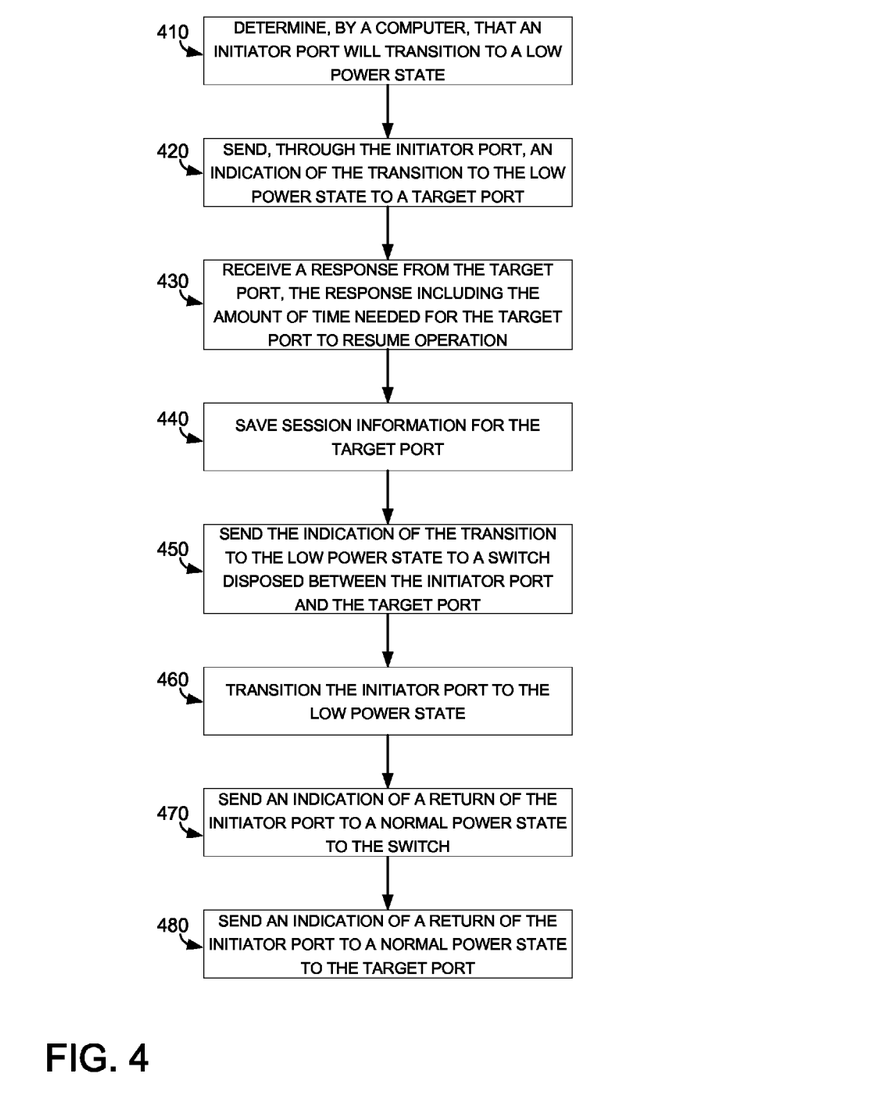
FIG. 4 is an example of a high level flow diagram for transitioning an initiator port to a low power state and returning to a normal power state.

FIG. 4 is an example of a high level flow diagram for transitioning an initiator port to a low power state and returning to a normal power state. In block 410, a computer may determine, for whatever reason, that an initiator port will transition to a low power state. In block 420, an indication of the transition to the low power state may be sent through the initiator port to the target port. In block 430 a response may be received from the target port. The response may include the amount of time needed by the target port to return to resume operation in a normal power state.

In block 440, session information for the target port may be saved. This session information may be used when the time to transition back to the normal power state arrives. In block 450, an indication of the transition to a low power state may be sent to a switch disposed between the initiator port and the target port. In block 460, the initiator port may be transitioned to a low power state.

In block 470, and indication of a return to a normal power state may be sent to the switch. This may cause the switch to restore the session using the previously stored session information. In block 480, an indication of a return to the normal power state may be sent from the initiator port to the target port. This may cause the target port to restore the session using the previously saved session information.

Figure 5:
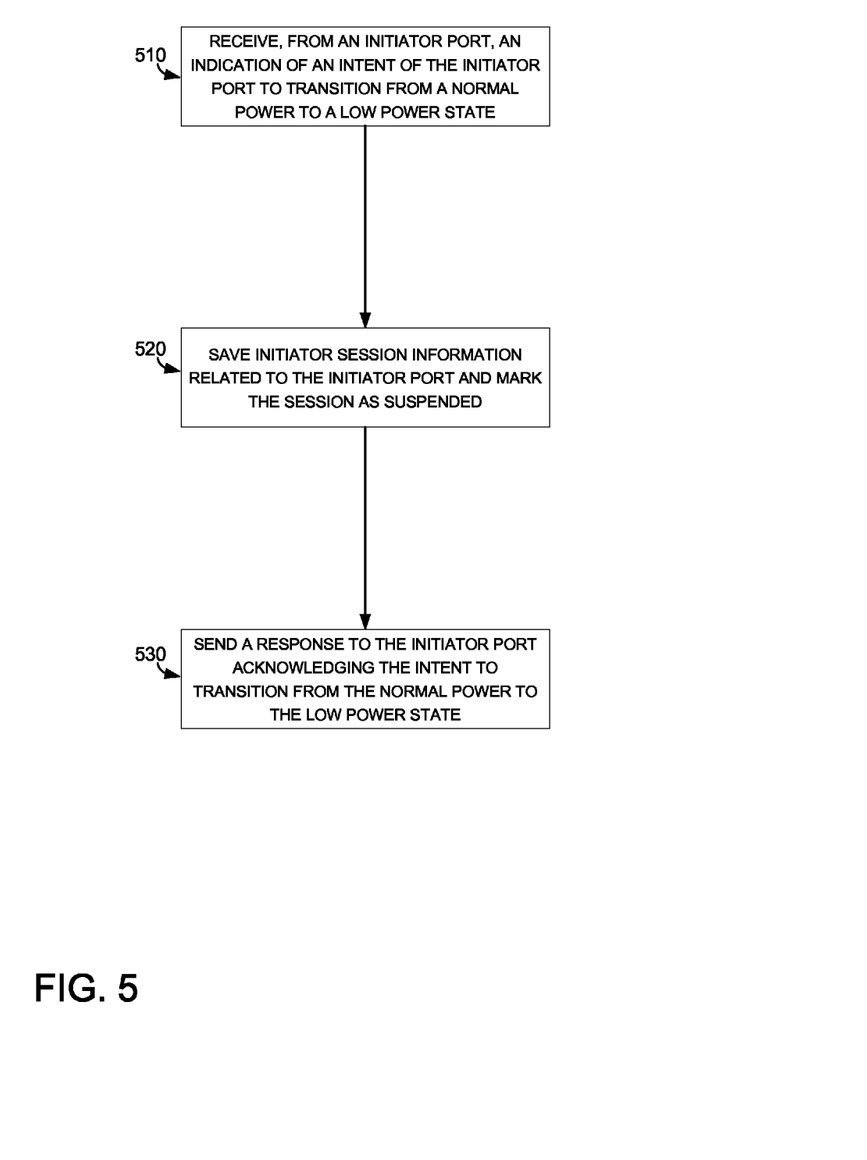
FIG. 5 is an example of a high level flow diagram for transitioning a target port to a low power state.

FIG. 5 is an example of a high level flow diagram for transitioning a target port to a low power state. In block 510, an indication of the intent of the initiator port to transition from a normal power state to a low power state may be received from an initiator port. In block 520, initiator session information related to the initiator port may be saved. The session may be marked as suspended. In block 530, a response may be sent to the initiator port acknowledging the intent to transition from the normal power to the low power state.

Figure 6A:
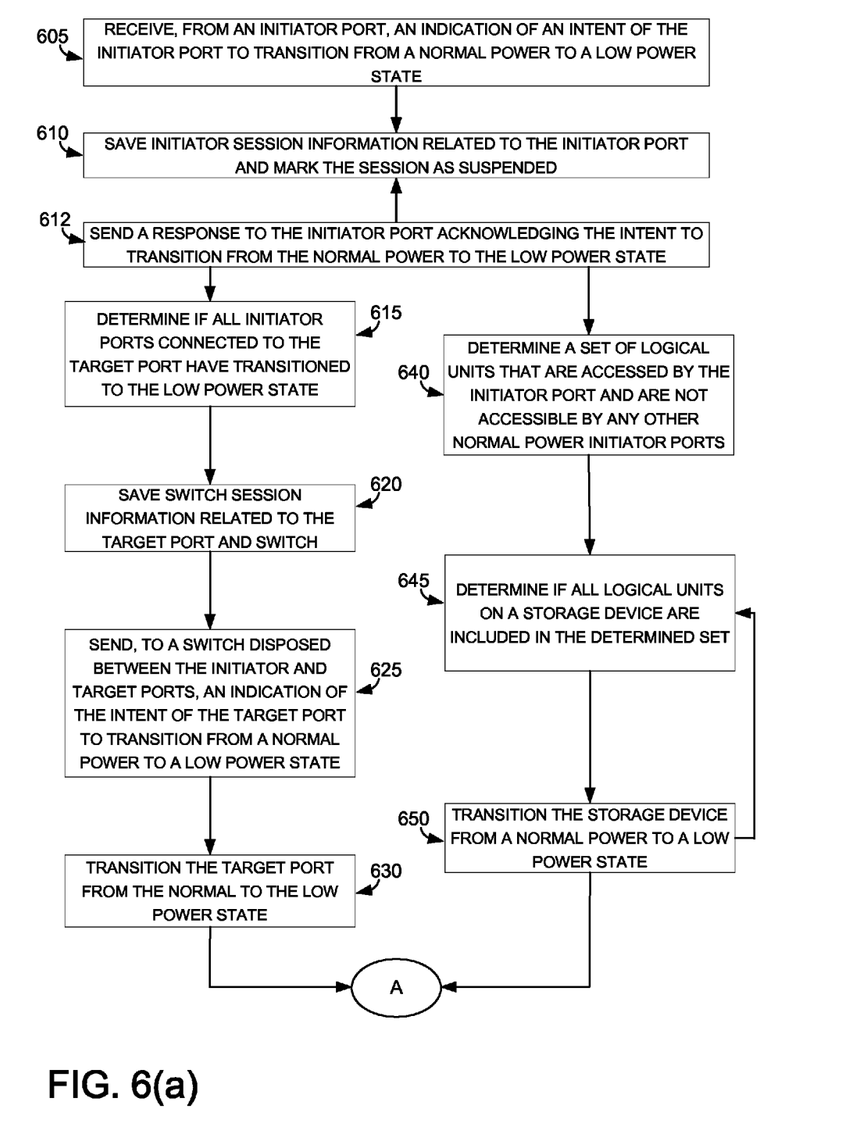
Figure 6B:
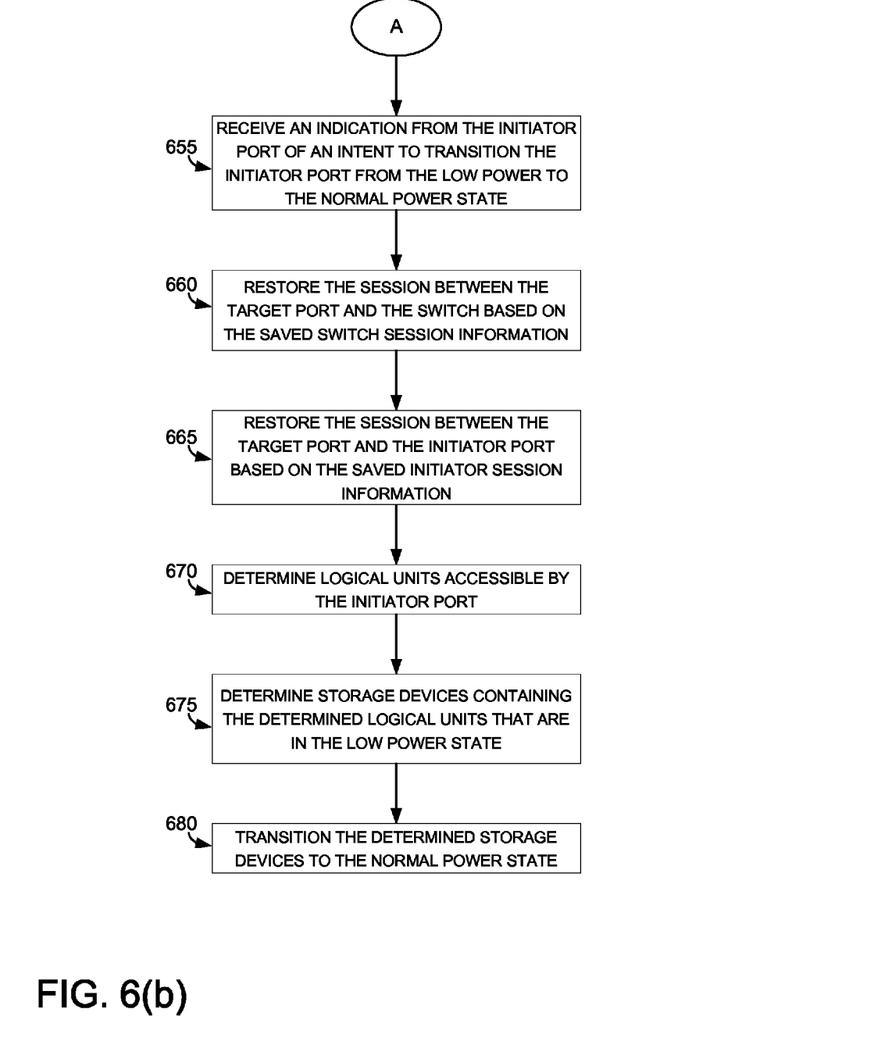

FIGS. 6(a,b) is an example of a high level flow diagram for transitioning a target port to a low power state and returning to a normal power state. In block 605, an indication of an intent of the initiator port to transition from a normal power state to a low power state may be received from the initiator port. In block 610, initiator session information related to the initiator port may be saved. The session may be marked as suspended.

In block 612, a response may be sent to the initiator port acknowledging the intent to transition from the normal power state to the low power state. In block 615 it may be determined if all initiator ports connected to the target port have transitioned to the low power state. If so, it may be possible to transition the target port to a low power state. In block 620, session information related to the target port and switch may be saved. This information may be used later when it is time for the target port to transition back to the normal power state. In block 625, an indication of the intent to transition the target port from a normal power state to a low power state may be sent to a switch disposed between the initiator and target ports. In block 630, the target port may be transitioned from the normal to the low power state.

In block 640, a set of logical units that are accessed by the initiator port via the target port and are not accessible by any other normal power initiator ports may be determined. This step may be used to determine which storage devices may be transitioned to the low power state. In block 645, it may be determined if all logical units on a storage device are included in the determined set. If there is at least one logical unit on the storage device that is accessed by a different initiator port, and thus is not included in the set, the storage device may not be transitioned into a low power state. In block 650, the storage device may be transitioned from a normal power to a low power state. This process may be repeated for each storage device containing a logical unit determined in block 640. Although blocks 640-650 are shown as occurring in parallel with blocks 615-630, this is not intended to imply that the steps are conducted in parallel. Any ordering is possible. Rather, the parallel depiction is shown to indicate that a decision to transition to the low power state is made for each storage device individually.

In block 655, an indication of the intent to transition the initiator port from the low power state to the normal power state may be received from the initiator port. In block 660, the session between the target port and the switch may be restored based on the stored session information. In block 665, the session between the target port and the initiator port may be restored based on the saved initiator session information.

In block 670, logical units accessible by the initiator port may be determined. In block 675, storage devices containing the determined logical units that are in the low power state may be determined. In block 680, the determined storage devices may be transitioned to the normal power state.

We claim:

1. A method comprising:
    determining, by a computer, that an initiator port will transition to a low power state;
    sending, through the initiator port, an indication of the transition of the initiator port to the low power state and save switch information for the initiator port to a target port and to a switch;
    sending, through the target port, an indication of an intent to transition the target port to the lower power state and save switch information for the target port to a switch;
    in response to said determination in a session, saving session information for the initiator port to a recoverable location, wherein the session information comprises sufficient information to reestablish the session after returning the initiator port from the low power state; and
    receiving, at the switch, the indications and save switch session information for the initiator port and target port; and
    transitioning the initiator port to the low power state.

2. The method of claim 1 further comprising:
    receiving a response from the target port, the response including the amount of time needed for the target port to resume operation.

3. The method of claim 2 further comprising:
    sending an indication of a return of the initiator port to a normal power state to the target port.

4. The method of claim 3, wherein the indication of return to a normal power state of the initiator port is sent before further activity is requested from the target port by at least an amount of time needed for the target port to resume operation.

5. The method of claim 1 further comprising:
    sending the indication of the transition to the low power state to a switch disposed between the initiator port and the target port.

6. The method of claim 5 further comprising:
    sending an indication of a return of the initiator port to a normal power state to the switch.

7. The method of claim 1, further comprising restoring a session between the target port and the initiator port without rediscovery.

8. The method of claim 1, wherein transitioning the initiator port to the low power state comprises:
    transitioning the initiator port to the low power state upon receipt of an acknowledgement message from the target port, and
    transitioning the initiator port to the low power state after a fixed period of time after sending the indication to the target port.

9. A non-transitory processor readable medium containing thereon a set of instructions, which when executed by the processor cause the processor to:
    receive, from an initiator port, an indication of an intent of the initiator port to transition from a normal power to a low power state;
    save initiator session information related to the initiator port and mark the session as suspended;
    send a response to the initiator port acknowledging the intent to transition from the normal power to the low power state;
    determine a set of logical units that are accessed by the initiator port and are not accessible to any other normal power initiator ports;
    determine if all logical units on a storage device are included in the determined set; and
    transition the storage device from a normal power to a low power state.

10. The medium of claim 9 further comprising:
    determine if all initiator ports connected to the target port have transitioned to the low power state;
    send, to a switch disposed between the initiator and target ports, an indication of
    the intent of the target port to transition from a normal power to a low power state; save switch session information related to the target port and switch; and transition the target port from the normal to the low power state.

11. The medium of claim 10 wherein the response includes the amount of time needed to transition the target port from a low power to a normal power state.

12. The medium of claim 11 further comprising:
    receive an indication from the initiator port of an intent to transition the initiator port from the low power to the normal power state;
    restore the session between the target port and the switch based on the saved switch session information; and
    restore the session between the target port and the initiator port based on the saved initiator port session information.

13. The medium of claim 12 further comprising:
    determine logical units accessible by the initiator port;
    determine storage devices containing the determined logical units that are in the low power state; and
    transition the determined storage devices to the normal power state.

14. The medium of claim 9, further comprising instructions causing the processor to restore a session between the initiator port and the target port without rediscovery of the target port after returning the initiator port to the normal power state from the low power state.

15. A system comprising:
    a computer including an initiator port to send an indication of the intent to transition the initiator port to a low power state to a target port, save target port session information, send the indication of the intent to transition the initiator port to the low power state to a switch, save switch session information and transition to the low power state; and
    the target port to receive the indication, send an indication of an intent to transition the target port to the low power state to the switch, save switch session information and save initiator port session information, the initiator port session information comprising sufficient information to re-establish a previous session after returning the initiator port from the low power state; and
    the switch to receive the indications and save switch session information for the initiator port and target port.

16. The system of claim 15 further comprising:
    the target port to transition to a low power state when no other initiator port is using the target port.

17. The system of claim 15 further comprising:
    the initiator port to transition from the low power state to the normal power state, send an indication of the transition to the switch and the target port, and restore the saved switch and target port session information;
    the target port to transition from the low power state to the normal power state and restore the saved initiator and switch session information; and
    the switch to restore the initiator and target port session information.

18. The system of claim 17, wherein the system restores a session after returning the initiator port to the normal power state without rediscovery of the target port.

* * * * *